Patented Aug. 7, 1923.

1,464,137

UNITED STATES PATENT OFFICE.

JOSEPH V. MEIGS, OF MONTCLAIR, NEW JERSEY, ASSIGNOR TO NEW JERSEY TESTING LABORATORIES, A CORPORATION OF NEW JERSEY.

PROCESS OF TREATING SULPHUR CHLORIDE.

No Drawing.    Application filed January 31, 1919.   Serial No. 274,307.

*To all whom it may concern:*

Be it known that I, JOSEPH V. MEIGS, a citizen of the United States, and a resident of Montclair, in the county of Essex and State of New Jersey, have invented certain new and useful Improvements in Processes of Treating Sulphur Chloride, of which the following is a specification.

This invention relates to a process of treating sulphur chlorides including the various forms thereof such as the mono chloride and the dichloride and has particular reference to the removal from crude sulphur chloride of certain impurities and coloring agents, all as will be hereinafter described and as claimed.

Crude sulphur chloride as ordinarily obtained is a dark brown or black product which contains impurities for example, iron and coloring agents that are objectionable. The object of the present invention is to remove such impurities and coloring substances in a cheap and efficient manner producing a light yellow or straw colored product acceptable to the trade.

For this purpose I make use of bodies such as kieselguhr, china clay, charcoal, pumice and other finely divided mineral bodies or other substances capable of occluding such impurities and coloring agents. In order to effect the removal thereof it is necessary simply to agitate the crude sulphur chlorides with 3 to 5% or so of such occluding agent.

For example to 1000 pounds of crude sulphur mono chlorides I add 3% of crude calcium carbonate and agitate the mixture thoroughly for five minutes, subsequently allowing to settle. The supernatant liquor is then filtered in any suitable manner, preferably with the aid of a filter press. The filtrate is of a light lemon or straw color and is then in a suitable condition for sale.

In another form of the invention the crude sulphur chloride material may be filtered through suitable decolorizing material such as a bed of fuller's earth, kaolin and the like. The filtration is preferably carried out in the cold although some elevation of temperature may be required in case of the removal of certain obstinate coloring agents.

The process as stated, is applicable to both the mono chloride and the dichloride of sulphur and I do not limit myself to any special form of sulphur chloride nor to any particular form of occluding agent. The latter may embrace a wide variety of substances in various physical forms. Preferably the occluding agent is of a finely divided character. This is especially desirable when the process of bleaching or decolorization is carried out by agitation. In the case of treatment by filtration the occluding material may be of a coarser character in order to have a suitably pervious filter bed. It is desirable to use an occluding substance which does not have any strong oxidizing action on the sulphur chloride. For this reason some forms of charcoal which contain considerable quantities of occluded oxygen and hence have a marked oxidizing effect are not used as advantageously as materials which do not contain any considerable amount of occluded oxygen.

I have also found it advantageous to use as an occluding or decolorizing agent one which is at the same time an anti-acid so as to effect the neutralization of free acid in said chloride of sulphur. This anti-acid decolorizing material may comprise the oxides, hydrated oxides and salts of the alkali or alkaline earth or earth metals. It is of course understood that such anti-acid materials must be in such a form that they will not interact with sulphur mono chloride. Calcium carbonate is an example of a material which acts at the same time, as a decolorizing and anti-acid material.

What I claim is:—

1. A process of decolorizing sulphur chloride which comprises agitating liquid sulphur chloride with a porous, absorbent, non-crystalline mineral material capable of removing impurities in the sulphur chloride, such material having decolorizing properties, and then separating the clear liquid from the said mineral material.

2. The process of treating the crude chlorides of sulphur with a material capable of removing organic impurities and foreign metallic substances by agitating the crude chloride of sulphur with an adsorbent which will act as a decolorizer.

3. The process of treating the crude chlorides of sulphur with a material capable of removing foreign coloring matter.

4. The process of treating the crude chlorides of sulphur with a material capable of removing organic impurities and foreign coloring matter which consists in agitating the crude chlorides with said material and subsequently filtering the mixture to recover the chloride of sulphur in a refined form.

5. The process of treating the crude chloride of sulphur to refine the latter which comprises passing the crude chloride through a mass of material capable of removing organic impurities and foreign substances, this mass of material acting as a filter.

6. The process of decolorizing crude chloride of sulphur which comprises contacting said chloride with a finely divided occluding agent and in thereafter filtering to remove said agent.

7. The process of bleaching chloride of sulphur which comprises agitating the chloride with finely divided non-crystalline, porous, mineral matter and in filtering to remove the latter.

8. The process of purifying crude sulphur chloride which consists in contacting the crude sulphur chloride with an agent which acts simultaneously as a decolorizer and an anti-acid.

9. The process of purifying crude sulphur chloride which consists in agitating the crude sulphur chloride with calcium carbonate and subsequently filtering to recover the refined sulphur chloride.

10. The process of purifying crude sulphur chloride which consists in agitating the crude sulphur chloride with 3–10% of calcium carbonate and subsequently filtering to recover the refined sulphur chloride.

11. A process of decolorizing sulphur monochloride which comprises treating the liquid with finely divided porous absorbent material and then separating the clear liquid from the said absorbent material.

JOSEPH V. MEIGS.